(12) United States Patent
Bueno de Santiago (10) Patent No.: US 11,378,065 B2
(45) Date of Patent: Jul. 5, 2022

(54) HUB ACCESS THROUGH NACELLE

(71) Applicant: General Electric Renovables España, S.L., Barcelona (ES)

(72) Inventor: Adrián Bueno de Santiago, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/184,662

(22) Filed: Feb. 25, 2021

(65) Prior Publication Data
US 2021/0270245 A1    Sep. 2, 2021

(30) Foreign Application Priority Data

Feb. 28, 2020   (EP) .................................... 20382148

(51) Int. Cl.
*F03D 80/50* (2016.01)

(52) U.S. Cl.
CPC .......... *F03D 80/50* (2016.05); *F05B 2230/80* (2013.01); *F05B 2240/14* (2013.01); *F05B 2260/406* (2013.01)

(58) Field of Classification Search
CPC .. F03D 80/50; F05B 2240/14; F05B 2230/80; F05B 2260/40
See application file for complete search history.

(56) References Cited

U.S. PATENT DOCUMENTS

| | | | |
|---|---|---|---|
| 7,845,693 B2 | 12/2010 | Li et al. | |
| 9,115,698 B2 | 8/2015 | Segovia et al. | |
| 9,624,910 B2 | 4/2017 | Kohne et al. | |
| 2010/0129216 A1 | 5/2010 | Bagepalli et al. | |
| 2011/0182750 A1 | 7/2011 | Olesen et al. | |
| 2013/0236311 A1* | 9/2013 | Segovia | ................ F03D 1/0691 416/146 R |
| 2013/0309090 A1* | 11/2013 | Abolfazlian | ............ F03D 9/255 416/1 |

(Continued)

FOREIGN PATENT DOCUMENTS

| | | |
|---|---|---|
| CN | 109219700 A | 1/2019 |
| EP | 2568162 A1 | 3/2013 |
| JP | 2011032965 A | 2/2011 |

OTHER PUBLICATIONS

European Search Report Correspondiing to EP20382148 dated Sep. 2, 2020.

*Primary Examiner* — Sean Gugger
(74) *Attorney, Agent, or Firm* — Dority & Manning, P.A.

(57) ABSTRACT

The disclosure relates to a nacelle configured to be mounted on top of a wind turbine tower, comprising a nacelle hatch for covering a nacelle opening at a side of the nacelle facing a wind turbine hub. The nacelle hatch is completely supported by the nacelle when the hatch is closed, and the nacelle hatch forms a passageway to an opening in the wind turbine hub at a side of the wind turbine hub facing the nacelle when the hatch is opened. The passageway comprises a first side structure at least partially obstructing a downwards view on a first side of the hub and a second side structure at least partially obstructing a downwards view on a second side of the hub, the second side being opposite to the first side. The present disclosure further relates to wind turbines and to methods for accessing a wind turbine hub from a nacelle.

12 Claims, 7 Drawing Sheets

(56) References Cited

U.S. PATENT DOCUMENTS

| | | | |
|---|---|---|---|
| 2015/0267685 A1* | 9/2015 | Rytter | F03D 80/88 |
| | | | 415/1 |
| 2019/0226460 A1* | 7/2019 | Madsen | F03D 80/00 |
| 2020/0018292 A1 | 1/2020 | Taubenrauch et al. | |
| 2020/0408195 A1* | 12/2020 | Jensen | F03D 7/0212 |

* cited by examiner

Fig. 5C

HUB ACCESS THROUGH NACELLE

The present disclosure relates to methods and systems for providing access from a nacelle of a wind turbine to a wind turbine hub. More particularly, the present disclosure relates to methods and systems for providing a secure access from a wind turbine nacelle to a wind turbine hub.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft is then rotatably mounted in the nacelle using one or more rotor shaft bearings arranged in a frame inside the nacelle. The nacelle is a housing arranged on top of a wind turbine tower that contains and protects e.g. the gearbox (if present) and generator and, depending on the wind turbine, further components such as a power converter, and auxiliary systems.

Maintenance inside the wind turbine hub may be required periodically. E.g. pitch drives and pitch bearings, attachments of the blade root, lubrication systems, electrical systems and others may be inspected and repaired from the inside of the wind turbine hub, if needed.

Depending on the wind turbine configuration, operators can reach and access the hub through a variety of ways. In e.g. direct drive wind turbines, access may be available through the inside of the generator. In other configurations, and particularly configurations with a rotor shaft rotatably mounted in a frame in the nacelle, access may be provided through a hatch at the roof of the nacelle. An operator can exit the nacelle through the hatch in the roof and then enter into the hub through a hatch at the front side of the hub or a hatch at the rear side of the hub. When an operator exits the nacelle and makes his or her way to the hub, the operator is exposed to and unprotected from the exterior, e.g. rain, hail, wind gusts etc. Even though fall protection systems may be used, the procedure still supposes a health and safety issue and operators may experience anxiety during such procedures.

Examples of the present disclosure provide methods and systems for accessing a wind turbine hub from a nacelle that at least partially resolve some of the aforementioned problems.

SUMMARY

In a first aspect of the present disclosure, a nacelle configured to be mounted on top of a wind turbine tower is provided. The nacelle comprises a nacelle hatch for covering a nacelle opening at a side of the nacelle facing a wind turbine hub, wherein the nacelle hatch is completely supported by the nacelle when the hatch is closed. The nacelle hatch forms a passageway to an opening in the wind turbine hub at a side of the wind turbine hub facing the nacelle when the hatch is opened, the passageway comprising a first side structure at least partially obstructing a downwards view on a first side of the hub and a second side structure at least partially obstructing a downwards view on a second side of the hub, the second side being opposite to the first side.

In accordance with this aspect, a nacelle is provided which comprises a nacelle hatch which can reduce anxiety for operators when they need to access the hub from the nacelle. When opened, the hatch partially or completely obstructs a view downwards for an operator, which can reduce anxiety. Safety may be improved by having a protective structure reducing the chances of a fall. The hatch when closed is completely supported by the nacelle i.e. there is no connection to the hub. There are thus no components that are fixed or otherwise attached to the hub. Manufacture of the hub can be maintained as before i.e. without a passageway to the hub.

Obstructing a view may herein be understood as to block, hinder, alter or impede a view. A structure that obstructs a view at least partially may herein be understood as any structure that hinders a view, such that an operator notices a presence of the structure when looking and his/her view of objects or surroundings on another side of the structure is substantially different than in absence of the structure.

A passageway may be understood herein as any structure forming a way of passage for an operator between the nacelle and the hub. The passageway may be completely or only partially covered and may include complete or partial sidewalls. The structure of the passageway may be load bearing, partially load bearing or not load bearing.

In another aspect, a method for accessing a wind turbine hub from a nacelle, is provided. The method comprises opening a hatch at a front side of the nacelle, and deploying the hatch such that the hatch forms a passageway to an opening in the wind turbine hub at a rear side of the wind turbine hub. The passageway comprises a first side structure substantially blocking a downwards view on a first side of the hub and a second side structure substantially blocking a downwards view on a second side of the hub, the second side being opposite to the first side.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
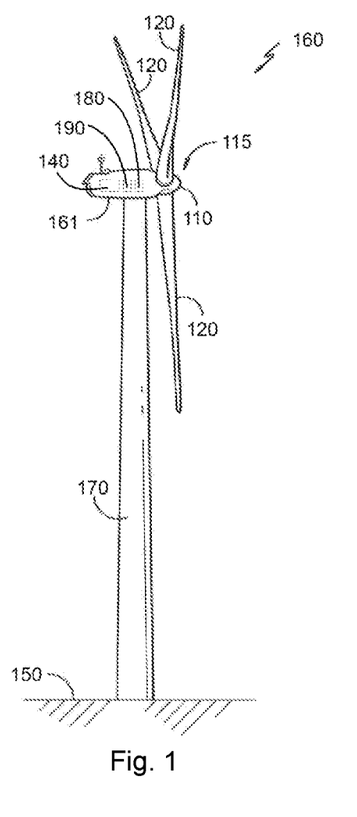
FIG. 1 illustrates a perspective view of one example of a wind turbine.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
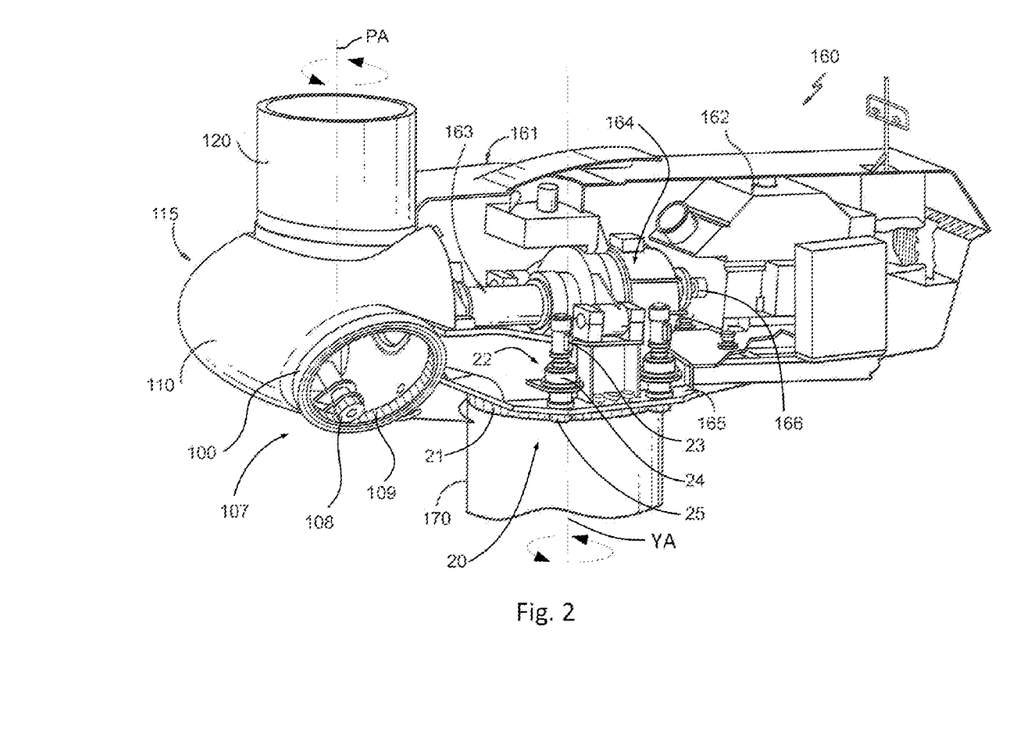
FIG. 2 illustrates a simplified, internal view of one example of the nacelle of the wind turbine of the FIG. 1.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a yaw axis YA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis PA.

Figure 3A:
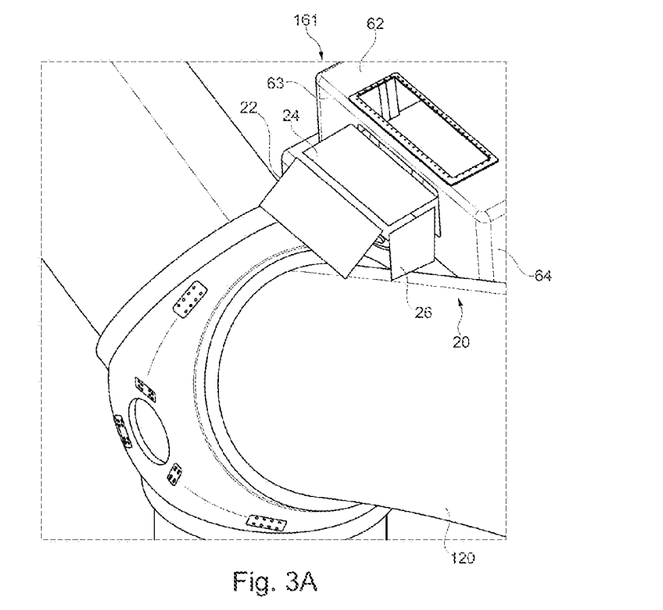
FIGS. 3A-3D schematically illustrate an example of a nacelle hatch.
Figure 3B:
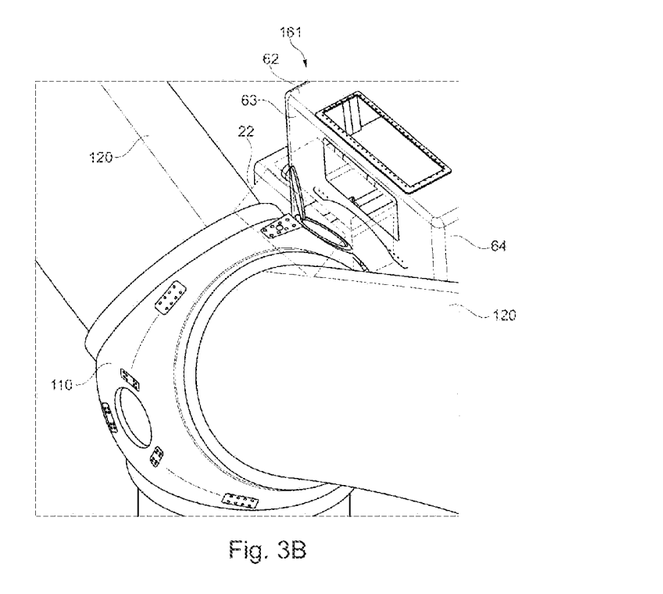
Figure 3C:
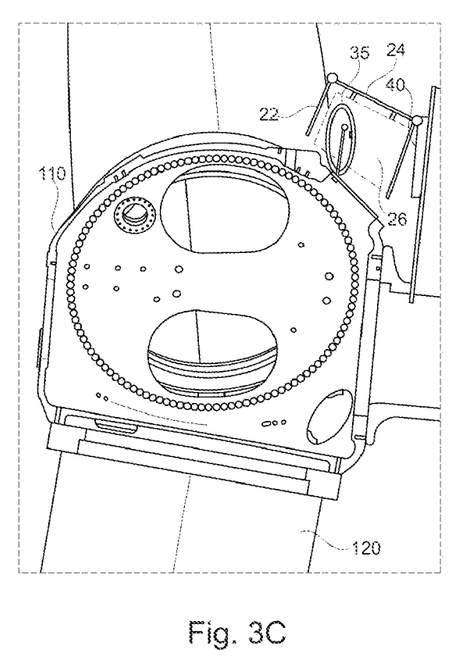
Figure 3D:
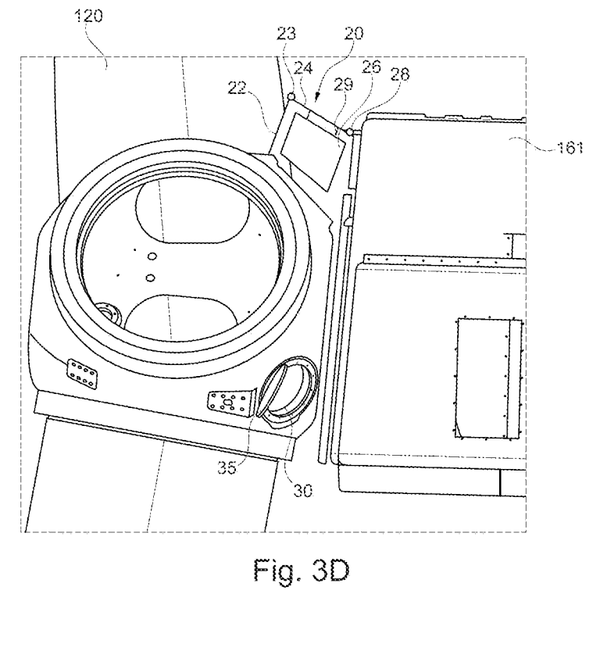
Figure 3E:
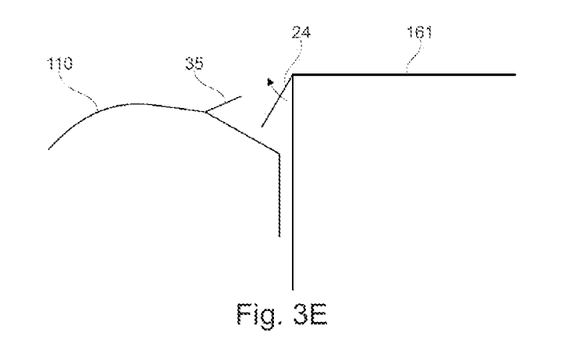
FIGS. 3E-3G schematically illustrates a method for deploying an example of the nacelle hatch, FIG. 4 schematically illustrates a further example of a nacelle hatch.
Figure 3F:
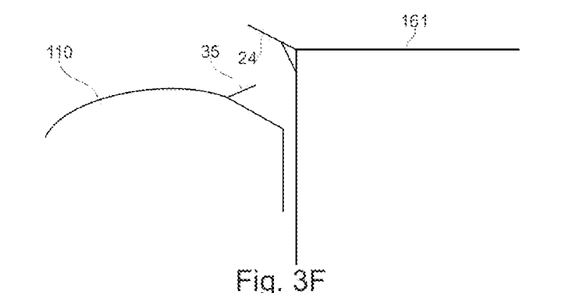
Figure 3G:
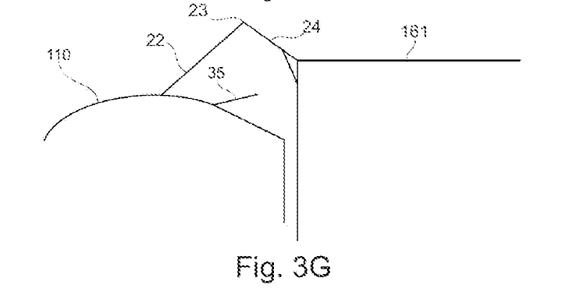

FIGS. 3A-3D schematically illustrate an example of a nacelle hatch. FIG. 3A illustrates an isometric view of the wind turbine rotor and nacelle with a deployed hatch. FIG. 3B illustrates the same view, wherein the hatch has been made transparent to show component. FIGS. 3C and 3D show a side view of the same nacelle and hatch. FIGS. 3E-3G schematically illustrates a method for deploying this same nacelle hatch.

FIG. 3A illustrates an isometric view of a nacelle 161 configured to be mounted on top of a wind turbine tower. The nacelle 161 comprises a nacelle hatch 20 for covering a nacelle opening at a side of the nacelle facing a wind turbine hub. The nacelle hatch is completely supported by the nacelle 161 when the hatch is closed. This may be seen in FIG. 3E.

The nacelle hatch 20 forms a passageway to an opening 30 in the wind turbine hub at a side of the wind turbine hub facing the nacelle when the hatch is opened. The passageway comprises a first side structure 26 at least partially obstructing a downwards view on a first side of the hub and a second side structure 26 at least partially obstructing a downwards view on a second side of the hub, the second side being opposite to the first side.

In the example of FIG. 3, the wind turbine has the rotor upstream from the nacelle. The upstream or front surface of the nacelle 63 thus faces the hub, whereas the rear surface or downstream surface of the hub faces the nacelle. In other examples, the rotor may be arranged downstream from the nacelle.

The nacelle may further comprises side surfaces 64 and top surface or "roof" surface 62. The nacelle may generally house the rotor shaft, gearbox (if present), and the generator. Other components such as batteries, converters, power cables, A/C systems etc. may also be partially or completely contained within the nacelle 161.

In some examples, the nacelle hatch 20 may comprise one or more panels hingedly mounted to the nacelle for forming the passageway. In the example of FIG. 3, the nacelle hatch 20 comprises a first top panel 24 hingedly mounted to the nacelle 161.

Hinges 28 that allow rotation of the first top panel from covering an opening in the nacelle to an open position have been schematically illustrated.

A first side panel 26 hingedly mounted to the first top panel 24 to form at least part of the first side structure, and a second side panel 26 hingedly mounted to the first top panel 24 to form at least part of the second side structure. Hinges 29 have been schematically illustrated and may be seen e.g. in FIGS. 3C and 3D.

In the example of FIG. 3, the nacelle hatch 20 furthermore comprises a second top panel 22 hingedly mounted at a front edge of the first top panel 24. Hinges 23 have been schematically illustrated in FIGS. 3C and 3D at a front edge of the first top panel.

When an operator needs to access the hub, a path may be provided from the nacelle to the hub. The side panels 26 block the view of an operator downwards on either side of the hub, and may increase security by avoiding falls on either side of the hub when stepping from the nacelle to the hub.

FIGS. 3E-3G schematically illustrate side views of an example of a method for accessing the wind turbine hub 110 from the nacelle 161. Before accessing the hub, the wind turbine rotor may have been rotated to one of a plurality of predetermined positions suitable for maintenance. In particular, three of such positions may be predefined, e.g. the three positions corresponding to a bunny ears configuration. In the bunny ears configuration, one of the blades is pointing straight down, whereas the other blades are pointing upwards.

Specifically, after rotating the hub to such a position or stopping the hub in such a position, the rotor may be locked in place. The rotor may be provided with a locking plate, and a bolt or pin may be inserted from the nacelle in a hole in the locking plate to secure the rotor in its position. However, one of the aspects of the nacelle hatches disclosed herein is that since the nacelle hatch can be completely supported by the hub, maintenance may potentially be carried out even when the rotor is not exactly in one of the predefined stopping or locking positions.

The method may then comprise opening a hatch 20 at a front side of the nacelle, as shown in FIG. 3E. The method then comprises deploying the hatch 20 such that the hatch 20 forms a passageway to an opening 30 in the wind turbine hub 110 at a rear side of the wind turbine hub 110. The passageway comprises a first side structure 26 substantially blocking a downwards view on a first side of the hub and a second side structure 26 substantially blocking a downwards view on a second side of the hub, the second side being opposite to the first side.

The opening 30 in the wind turbine hub allowing access to the inside of the hub may be provided with a cover 35. In some examples, cover 35 may be securely locked when in its opened position. Cover 35 in its opened position may be encompassed within the passageway formed by hatch 20.

In the specific example of FIG. 3, deploying the hatch 20 comprises pushing a first panel 24 hingedly mounted to the nacelle. The first panel 24 which is mounted to the nacelle may form a first top panel when deployed. The deploying of the hatch 20 may further comprise unfolding a plurality of panels 22, 26 that are hingedly mounted to the first panel 24.

In some examples, the hatch may be configured to selectively lock the panels in an opened position. This may apply to one or more or all of the panels. In FIG. 3E, the first top panel 24, may be locked in place before unfolding the other panels. Locking of the panels may be done in a variety of ways, such as mechanically blocking with a latch or using a pneumatic or hydraulic system.

The other panels which are suspended from the first top panel may also be locked in an open position by suitable mechanical, electrical, pneumatic or hydraulic systems.

In the example illustrated in FIG. 3, and particularly in FIG. 3F, the hatch when opened may be supported by the hub. In other examples, the hatch, when opened, may still be fully supported by the nacelle.

In some examples, the hatch 20 may be configured to be manually opened and closed. An operator may in the example of FIG. 3 grab the first top panel and push it open. After securing the first top panel in the open position, the operator may then unfold the side panels 26 and unfold the second top panel 22. To retract the hatch, e.g. after maintenance inside the hub has been completed, the procedure may be followed in opposite order. In alternative examples, a system involving motors and/or pistons may be used to automatically or semi-automatically deploy the hatch when needed and also to retract the hatch.

Figure 4:
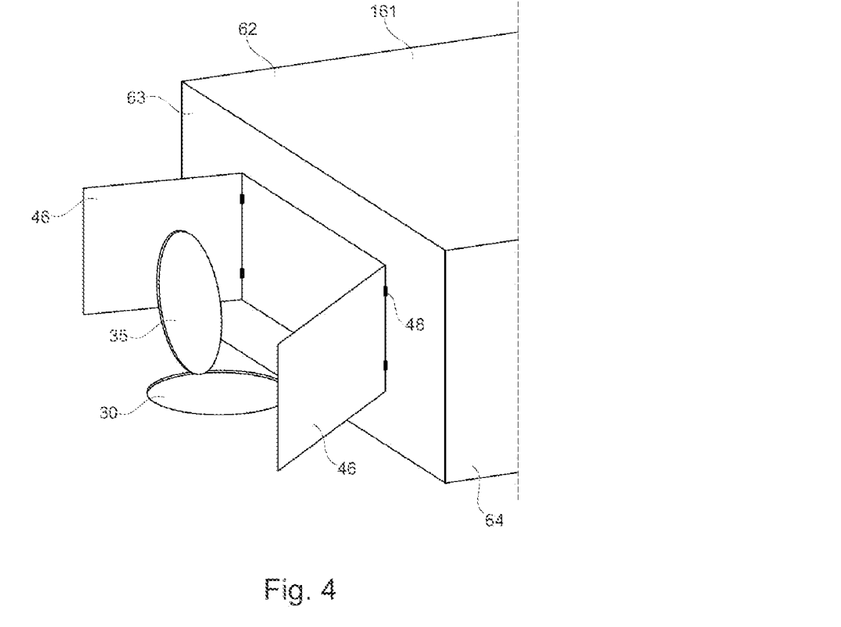

FIG. 4 schematically illustrates a further example of a nacelle hatch 20. In this example, the nacelle hatch comprises a first side panel 46 hingedly mounted to the nacelle 161 for forming the first side structure, and a second side panel 46 hingedly mounted to the nacelle 161 for forming the second side structure. As in the example of FIG. 3, the side panels block or at least partially obstruct a downwards view of an operator wanting the access an opening 30 in the hub.

In the example of FIG. 3, the hatch when deployed to an open position, the operator is protected from the exterior e.g. hail, rain, wind gusts etc. In the example of FIG. 4, the hatch only protects the operator on the sides, but this can be sufficient for reducing anxiety of operators.

In some examples, when the hatch is opened, the first and second side panels 46 extend substantially to a top surface of the hub. I.e. the side panels 46 may be partially supported by the hub. The side panels are herein shown to be substantially rectangular. In other examples, the shape of the side panels may be irregular, e.g. the corners may be adapted to mate with a shape of the surface of the hub.

Figure 5A:
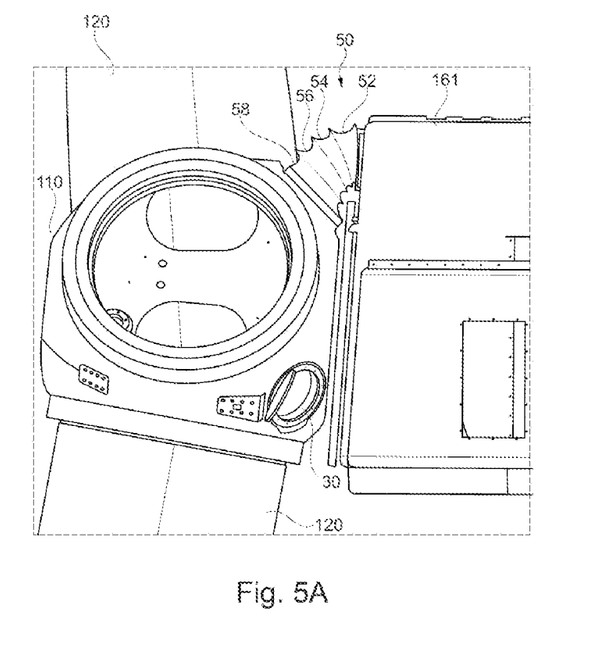
FIGS. 5A-5C schematically illustrates yet a further an example of a nacelle hatch.
Figure 5B:
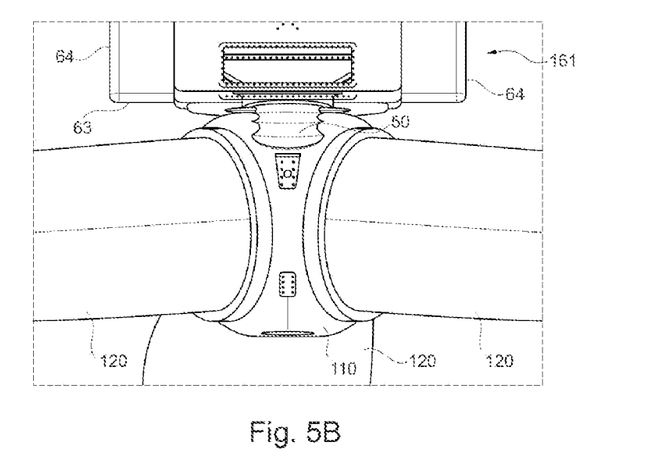
Figure 5C:
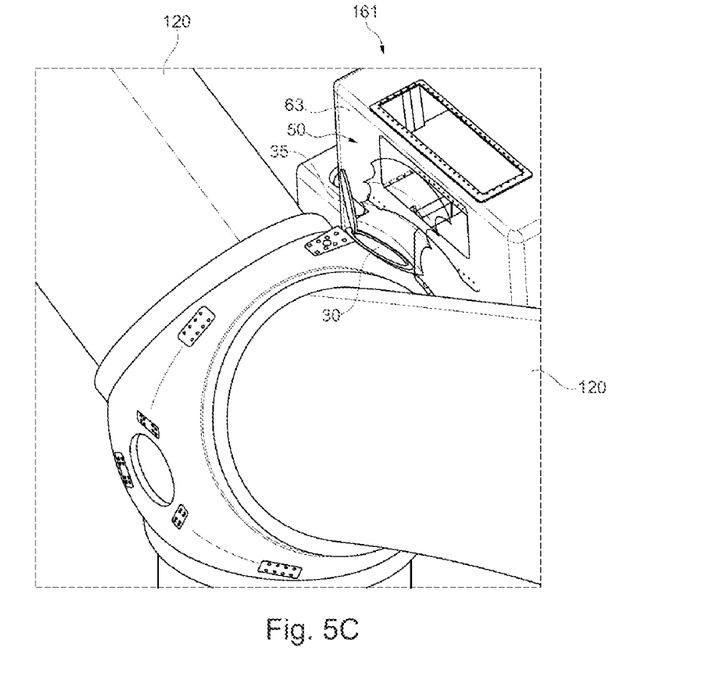

FIGS. 5A-5C schematically illustrates yet a further an example of a nacelle hatch.

In the example of FIG. 5, the nacelle hatch 50 comprises an expandable structure, which when expanded extends between an opening in the nacelle and the opening in the hub.

The passageway formed between the nacelle and the hub may be closed on the top and on either side such that operators are generally well protected from the exterior.

In the examples of FIG. 5, the expandable structure may comprise a bellows. The bellows may include a plurality of pleats 52, 54, 56, 58 which be collapsed on top of each other in the closed position of the hatch. In the open position or open configuration of the hatch 50, the pleats 52, 54, 56, 58 are separated from each other.

The hatch 50 may include a handle which an operator may grasp to push the hatch 50 towards the hub, and/or to pull the hatch back towards the nacelle. In other examples, opening and closing the hatch may be automatic, using e.g. an electric motor, pneumatic or hydraulic system.

In accordance with examples disclosed herein, a wind turbine may comprise a tower, a nacelle arranged on top of the tower, and a rotor including a rotor hub and a plurality of wind turbine blades. The rotor may be rotatably mounted with respect to the nacelle, and the nacelle may comprises a nacelle opening at an upstream side of the nacelle, and the hub comprises a hub opening at a downstream side of the hub. The nacelle comprises a nacelle hatch, the nacelle hatch covering the nacelle opening in a first configuration, and the nacelle hatch forming a passage to the hub opening in a second configuration. The nacelle hatch in the second configuration includes at least a protective structure on both sides of the passage.

A protective structure may herein be understood as any structure that increases security or protection for an operator to some extent when passing from the nacelle to the hub or vice versa. The protective structure may be completely secure in that an operator does not need to latch him/herself on to a safety line. In some examples, the protective structure may be sufficiently strong and stiff for operators to use it as a support and to be able to lean against it. In other examples, the protective structure may not be able to carry such loads but may still increase security for operators by blocking or reducing weather influences or by reducing anxiety for operators as hereinbefore explained.

In some examples, the nacelle hatch in the second configuration may include a protective structure at a top of the passage, such as shown in e.g. FIGS. 3 and 5.

In some examples, the nacelle hatch may comprise a plurality of unfoldable panels, such as shown in e.g. FIGS. 3 and 4. At least one of the plurality panels may be hingedly mounted to the nacelle.

In some examples, the nacelle hatch may comprise an expandable structure, such as shown in FIG. 4. In the example of FIG. 4, the expandable structure comprises a bellows, which may be a slidable bellows or corrugated bellows. In other examples, the expandable structure may include a telescopic structure, or telescopic elements.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A nacelle configured to be mounted on top of a wind turbine tower and comprising a nacelle hatch for covering a nacelle opening at a side of the nacelle facing a wind turbine hub, wherein
    the nacelle hatch is affixed to the nacelle and deployable from a compact closed position on the nacelle to an outward extended position from the nacelle towards the wind turbine hub,
    the nacelle hatch is completely supported by the nacelle when the hatch is closed, and
    the nacelle hatch comprising a passageway structure that closes the nacelle opening in the compact closed position and uncovers the nacelle opening and forms a passageway when the nacelle hatch is opened to the outward extended position, the passageway extending to an opening in the wind turbine hub at a side of the wind turbine hub facing the nacelle,
    the passageway structure comprising a first side structure at least partially obstructing a downwards view on a first side of the hub and a second side structure at least partially obstructing a downwards view on a second side of the hub, the second side being opposite to the first side.

2. The nacelle according to claim 1, wherein the passageway structure comprises one or more panels hingedly mounted to the nacelle and swingable away from the nacelle for forming the passageway.

3. The nacelle according to claim 2, wherein the hatch is configured to selectively lock the panels in an opened position.

4. The nacelle according to claim 2, wherein the nacelle hatch comprises a first side panel hingedly mounted to the nacelle for forming the first side structure, and a second side panel hingedly mounted to the nacelle for forming the second side structure.

5. The nacelle according to claim 4, wherein when the hatch is opened to the outward extended position, the first and second side panels extend substantially to a top surface of the hub.

6. The nacelle according to claim 1, wherein the nacelle hatch comprises an expandable structure, which when expanded to the outward extended position extends between the nacelle opening and the opening in the hub.

7. The nacelle according to claim 6, wherein the expandable structure comprises a bellows.

8. The nacelle according to claim 1, wherein the hatch is configured to be manually opened and closed.

9. The nacelle according to claim 1, wherein the hatch furthermore comprises a hydraulic system for opening and/or closing the hatch.

10. A wind turbine comprising the nacelle according to claim 1 on top of the tower and the wind turbine hub rotatably mounted in the nacelle.

11. A nacelle configured to be mounted on top of a wind turbine tower and comprising a nacelle hatch for covering a nacelle opening at a side of the nacelle facing a wind turbine hub, wherein
    the nacelle hatch is completely supported by the nacelle when the hatch is closed,
    the nacelle hatch forms a passageway when the hatch is opened to an opening in the wind turbine hub at a side of the wind turbine hub facing the nacelle,
    the passageway comprising a first side structure at least partially obstructing a downwards view on a first side of the hub and a second side structure at least partially obstructing a downwards view on a second side of the hub, the second side being opposite to the first side,
    wherein the nacelle hatch comprises one or more panels hingedly mounted to the nacelle for forming the passageway, and
    wherein the nacelle hatch comprises a first top panel hingedly mounted to the nacelle,
        a first side panel hingedly mounted to the first top panel to form at least part of the first side structure, and
        a second side panel hingedly mounted to the first top panel to form at least part of the second side structure.

12. The nacelle according to claim 11, wherein the nacelle hatch furthermore comprises a second top panel hingedly mounted at a front edge of the first top panel.

* * * * *